United States Patent [19]
Schmitz et al.

[11] Patent Number: 4,491,871
[45] Date of Patent: Jan. 1, 1985

[54] AUDIO-VISUAL DIPLEXED TELEVISION TRANSMITTER IN WHICH THE AURAL SIGNAL CAN BE MULTIPLEXED WITHOUT SWITCHING

[75] Inventors: Anthony N. Schmitz, Mount Laurel; Raymond N. Clark, Cherry Hill, both of N.J.

[73] Assignee: RCA Corporation, New York, N.Y.

[21] Appl. No.: 447,142

[22] Filed: Dec. 6, 1982

[51] Int. Cl.³ .................. H04N 5/38; H04N 5/40; H04N 7/04
[52] U.S. Cl. ..................................... 358/186; 358/143
[58] Field of Search ............. 358/143, 144, 186, 197, 358/198, 141, 142, 146; 370/37; 455/106, 109, 124, 129

[56] References Cited
U.S. PATENT DOCUMENTS

| | | | |
|---|---|---|---|
| 4,007,480 | 2/1977 | Wolters | 358/197 |
| 4,240,155 | 12/1980 | Vaughan | 370/37 |
| 4,339,773 | 7/1982 | Chemin et al. | 358/186 |

FOREIGN PATENT DOCUMENTS 2823013 12/1978 Fed. Rep. of Germany ...... 358/186

OTHER PUBLICATIONS

Data Sheet—Micro Communications Inc.—Series 4800 High-Power Waveguide Diplexers.

*Primary Examiner*—Tommy P. Chin
*Assistant Examiner*—Michael D. Parker
*Attorney, Agent, or Firm*—E. M. Whitacre; W. H. Meise

[57] ABSTRACT

A television transmitter uses a diplexer to combine the signals from a visual power amplifier and an aural power amplifier. The diplexer uses hybrids coupled together by transmission lines, and the transmission-lines have aural-frequency cavities which reflect the aural energy from the aural input port to the antenna output port. In the event that the aural power amplifier fails, it is desirable to revert to multiplexed operation, in which the visual amplifier amplifies combined visual and aural signals. This mode of operation is accomplished by switching the low-level aural signal for combining with the low-level visual signal and by simultaneously switching the tuning of the aural cavities.

10 Claims, 6 Drawing Figures

TYPICAL RESPONSE

AUDIO-VISUAL DIPLEXED TELEVISION TRANSMITTER IN WHICH THE AURAL SIGNAL CAN BE MULTIPLEXED WITHOUT SWITCHING

This invention relates to television transmitters in which separate aural and visual high-power signal generators are diplexed together for application to an antenna but in which the aural signal can be multiplexed with the visual carriers through the high-power visual section in the event of failure of the high-power aural section.

Broadcast television transmitters are used to generate high-power modulated signals for application to broadcast antennas. Such transmitters for television use may be capable of generating hundreds of kilowatts of visual signal energy within the television band. The aural carrier signal power is typically about 10 dB down from the peak visual carrier energy.

In one form of transmitter, the audio carrier is FM-modulated onto a 4.5 MHz carrier, the FM-modulated aural carrier is combined with baseband video, and the combined signal is amplitude-modulated to the final carrier frequency, with filters being used to reduce the lower sideband to the desired vestigal form. Amplifiers are used to raise the power level of the combined visual-aural signal to the desired level. Another form of transmitter AM-modulates the visual carrier onto an IF signal and FM-modulates the aural carrier onto an IF signal displaced from the first IF signal by the desired final difference between video and audio carriers, combines the two signals, AM modulates the combined signal desired visual carrier, and amplifies the composite signal. In yet another type of transmitter, a high-power oscillator tube is modulated by the combined video and audio-modulated FM signals. All of these configurations have combined video and aural signals passing through a high-power active device. As is well known, active devices are subject to nonlinearities of both amplitude and phase which lead to a multitude of undesirable intermodulation products. These products must be kept to a low level either by reducing the power output of the active device or by filtration. Filtration, however, cannot adapt to the intermodulation products, which vary with signal level. As a result, the transmitter arrangements in which both aural and visual signals pass through power active devices tend to be limited in power output.

It is known to overcome the above-mentioned limitations by keeping the visual and aural carriers separate through the active devices, and then combine the two separate high-power signals in a passive linear combiner. In such diplexed arrangements, one active device (or one set of active devices) produces the high-power modulated visual carrier and another produces the high-power aural signal. These are combined by a linear diplexer. A known form of diplexer consists of two 3 dB, 90° four-port couplers, two ports of each of which are coupled together by transmission lines. A further port of each hybrid is coupled to a source of high-power carriers (one to the visual, one to the aural). On the hybrid to which the visual carrier is coupled, the fourth port is terminated. On the hybrid to which aural carrier is coupled, the fourth port is the combined output port at which the linearly combined visual and aural carriers appear, and this port is normally coupled to the antenna. The transmission lines coupling together two ports of each hybrid are also coupled to transmission-line filters, including one tuned to 3.58 MHz below the visual carrier for preventing the lower-sideband visual-carrier-color-subcarrier intermodulation product from reaching the antenna, and another tuned to the aural carrier frequency for causing the reflections necessary to couple the aural carrier input port of the second hybrid to the antenna port. In such diplexers for UHF TV use manufactured by Micro Communications, Inc., located at Grenier Field, Manchester, N.H., the transmission-line filters are short-circuited circular waveguide. In another such diplexer manufactured by RCA Corporation, Front and Cooper Streets, Camden, N.J., the transmission-line filters are short-circuited rectangular waveguide.

For television transmitters of the diplexed type, the high-power aural carrier active device or set of devices can fail. This results in transmission of visual carriers without aural carrier. It would be desirable to be able to revert to the less desirable multiplexed operation from the more desirable diplexed operation in the event of failure of the high-power portions of the aural generator. In the past, this has been accomplished by coupling the low-level FM-modulated aural carrier with low-level visual information and applying the combination to the high-power visual active device, and at the same time bypassing the diplexer by means of high-power switch circuits. The low-level combining circuits are not a great problem, but the switching of the high-power signal requires very elaborate and expensive switches and circuits, or temporary shutdown of the still-operating high-power visual sections so as to be able to throw switches. It would be desirable to be able to switch over to multiplex operation without high-power switching in the event of failure of the high-power aural signal generator.

SUMMARY OF THE INVENTION

In short, in a diplexed TV transmitter having high-power visual and aural sections and a diplexer having a pair of hybrid combiner-splitters coupled together by transmission lines, and a port of each hybrid coupled to one of the high-power sections, with a reflective element coupled to the transmission lines and tuned to the aural carrier frequency, multiplex operation is accomplished by combining the low-level video and FM-modulated audio signals for application to the high-power visual section, and by simultaneously detuning the reflective element coupled to the transmission lines.

DESCRIPTION OF THE INVENTION

Figure 1A:
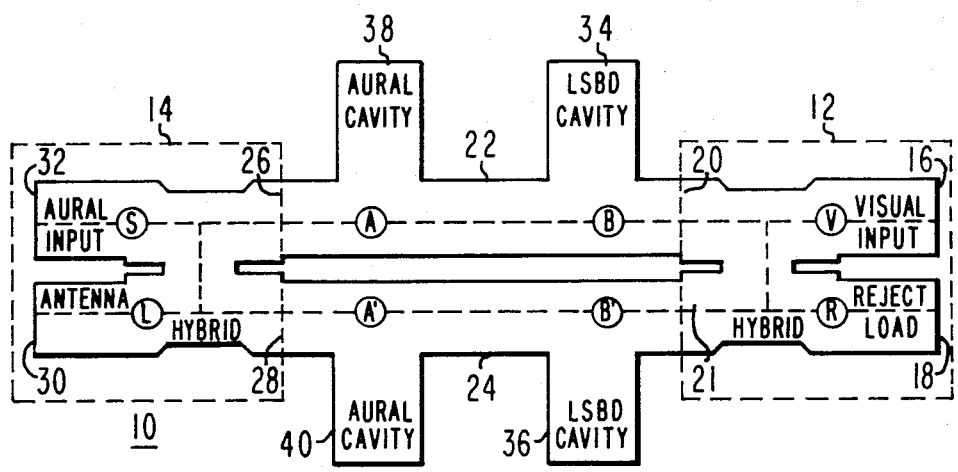
FIGS. 1a and 1b show a simplified block diagram of a prior-art diplexer as an aid to understanding the invention together with an amplitude-frequency plot.

The prior-art diplexer 10 illustrated in FIG. 1 includes two 3 dB, 90°, four-port waveguide hybrids 12, 14. Hybrid 12 includes a port 16 which is coupled to a source (not shown) of visual power and a second port 18 coupled to a matched load or termination (not shown). Third and fourth ports of hybrid 12 are coupled to two waveguide transmission-lines 22, 24. Transmission lines 22 and 24 are in turn coupled to a pair of ports 26, 28 of hybrid 14. A third port 30 is coupled to an antenna or other utilization device (not shown), and port 32 is coupled to a source of aural power (not shown). A pair of short-circuited lower side-band cavities 34, 36 are coupled to transmission-lines 22 and 24, respectively. Also coupled to transmission-lines 22 and 24 are aural cavities 38 and 40, respectively.

In operation, the visual power applied is applied to port 16 and is divided equally through the two branches of hybrid 12, half of the signal power flowing to port 20 and half to port 21. As a result of the hybrid action, the signals at ports 20 and 21 are 90° out-of-phase at the carrier frequency. The visual signals flowing to the left through transmission-lines 22, 24 are coupled to cavities 34, 36, which are tuned to 3.58 MHz (for NTSC) below the visual carrier frequency. This is the frequency at which undesirable intermodulation products will appear in the visual signal due to the action of the unavoidable nonlinearities in the power output stages of the visual power amplifier or generator on the principal signal components of a color television signal. For a transmitter operating in a PAL system, cavities 34, 36 would be tuned to 4.43 MHz below visual carrier at a frequency of these undesired intermodulation products, cavities 34 and 36 effectively present a short-circuit to transmission-lines 22 and 24 at points B and B1, and as a result, they are reflected from points B and B1 back through the hybrid, in which they undergo a second 90° relative phase shift. Those intermodulation products reflected back to port 16 arrive 180° out-of-phase and cancel, while they arrive in-phase at port 18 and are absorbed by the load. Thus, the lower sideband cavities do not change the signal at port 16 and therefore are isolated from the visual power signal source.

That portion of the visual signal which is in the principal portion of the channel is not affected by cavities 34, 36, and therefore continues to propagate to the left through transmission-lines 22, 24 past aural cavities 38, 40 to ports 26, 28 of hybrid 14. The aural cavities do not affect the visual signal because they are turned to present a short-circuit at the aural carrier i.e. at a frequency above the visual signal frequencies, and the circuit constants are selected such that the aural cavities are a parallel-resonant circuit at the visual frequencies. The visual signals arriving at ports 26 and 28 are coupled together in-phase at port 30 and out-of-phase at port 32, and therefore the visual energy couples to the antenna but is isolated from the aural input.

The aural input signal applied to port 32 is divided into two portions, one of which propagates to the right along transmission-line 22 from port 26 and another of which is propagated to the right in transmission-line 24 from port 28 with a relative phase-shift. The aural signals are coupled to aural cavities 38, 40, which are tuned to effectively present a short-circuit at points A, A'. The aural energy is reflected back to the left, and passes through hybrid 14a second time, adding in-phase at the antenna port 30 and out-of-phase at aural input port 32. The aural cavities are also adjusted to present a high impedance to the transmission-lines at the visual carrier frequency, so do not affect the flow of visual power.

Figure 1B:
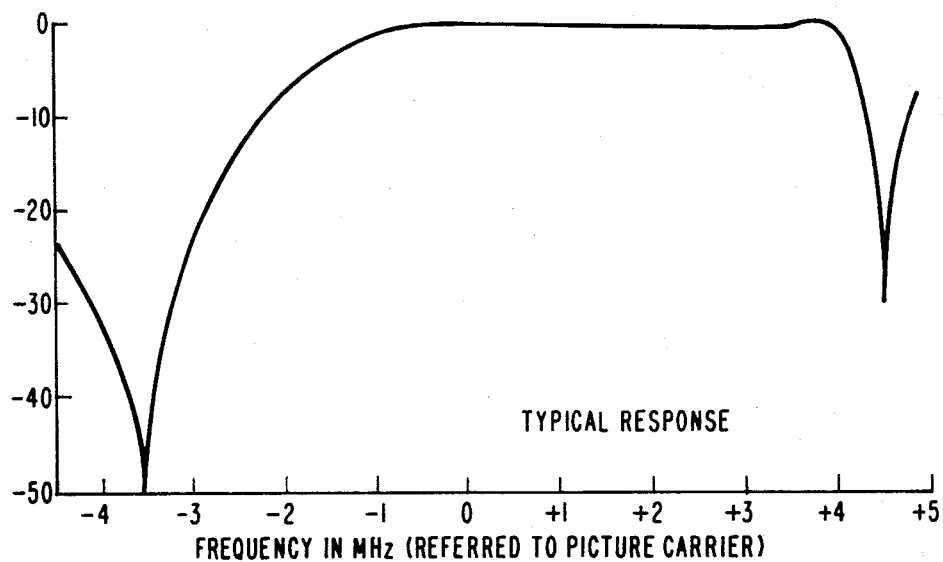
Figure 2:
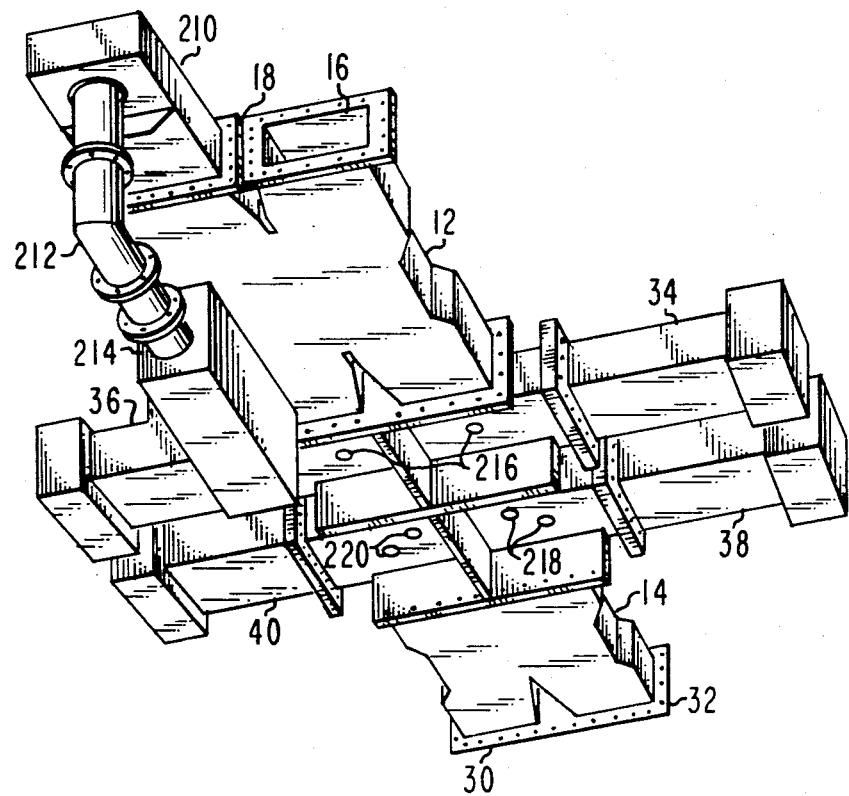
FIG. 2 is a bottom perspective view of the prior-art diplexer.

When diplexer 10 is properly balanced, aural and visual signals are diplexed to a common antenna with RF signal isolation between the power sources or transmitters. FIG. 1b illustrates a typical frequency-amplitude response curve for the path between visual input port 16 and antenna port 30 with the remaining ports terminated in the characteristic impedance of the transmission-line. FIG. 2 is a bottom perspective view of the prior art aforementioned RCA diplexer for UHF use. As illustrated, waveguide port 18 is coupled to a waveguide-to-coaxial transmission-line adapter 210 which couples energy to a coaxial transmission-line 212 which in turn is coupled to a terminating impedance or load 214. Waveguide ports 16, 30 and 32 are open, ready to be coupled to proper waveguides. Also visible in FIG. 2 are the ends of probes 216 which aid in coupling transmission-lines 22 and 24 to lower sideband cavities 34 and 36, and the ends of probe pairs 218, 220 which aid in coupling to cavities 38 and 40, respectively.

Figure 3:
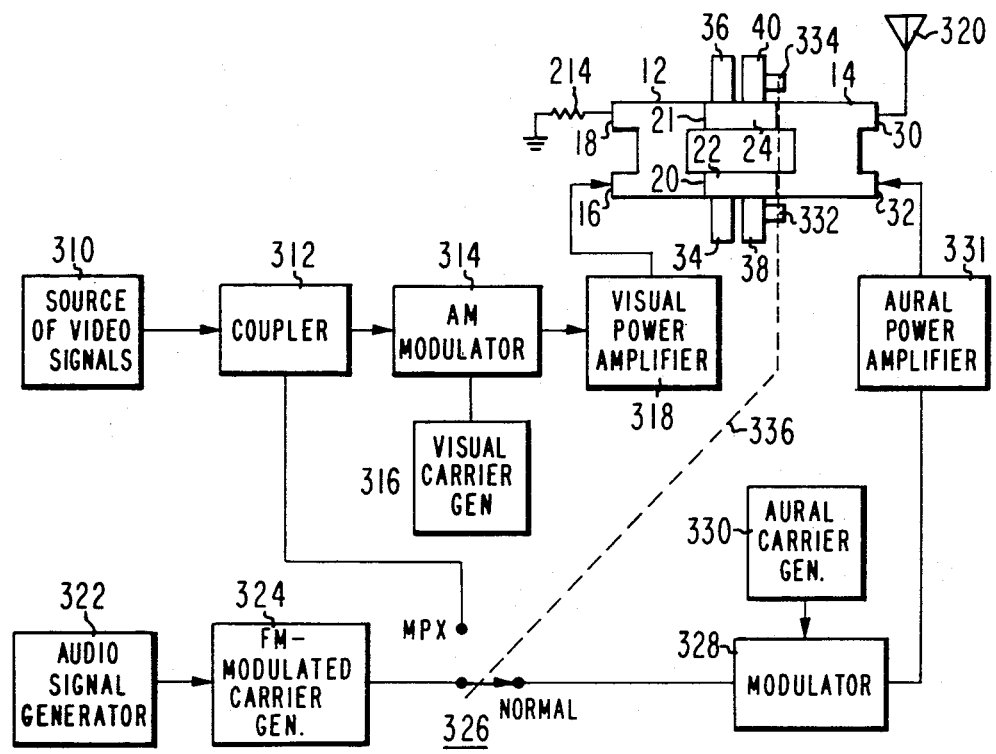
FIG. 3 is a simplified block diagram of a television transmitter according to an embodiment of the invention.

FIG. 3 illustrates a transmitter-antenna system according to the invention. In FIG. 3, a source 310 of video signals is coupled by a coupler 312 to an amplitude (AM) modulator 314, which modulates a visual carrier signal received from an oscillator 316 with the video signal to produce a modulated visual signal. The modulated visual signal is applied to a visual power amplifier 318 which produces a power visual signal for application to port 16 of hybrid 12. Port 18 of hybrid 12 is coupled to a load illustrated as a resistor 214, and port 30 is coupled to an antenna 320.

An audio signal associated with the video signal is generated by audio signal generator 322 and is coupled therefrom to a 4.5 MHz FM modulator-generator 324. The resulting 4.5 MHz FM-modulated signal is coupled by way of a ganged switch 326 to a modulator 328 which up-converts the FM-modulated 4.5 MHz baseband signal to the appropriate aural carrier frequency with the air of an aural carrier generator 330. The up-converted aural signal is applied to an aural power amplifier 330 for application to port 32 of hybrid 14.

In normal operation, switch 326 is in the position shown, and the high-power modulated aural and visual signals are duplex combined as described in conjunction with FIGS. 1 and 2 for application to the antenna.

Coupler 312 may be no more than a resistive adder circuit for coupling the aural and visual signals to a low-impedance point by way of resistors.

In case of failure of aural power amplifiers 330, switch 326 is either automatically or manually thrown from the NORMAL position to the MPX (multiplex) position. The 4.5 MHz modulated aural carrier is decoupled from modulator 328 and the failed aural power amplifier and is coupled instead to coupler 312, which combines the 4.5 MHz FM-modulated baseband carrier with the baseband video for application to AM modulator 314. This causes visual power amplifier 318 to amplify a signal which contains not only video but which also contains an audio carrier signal at the proper aural carrier frequency.

Referring back to FIG. 1, the multiplexed visual-aural signal enters port 16, and substantially equal amounts of the multiplexed signal propogate towards hybrid 14 along transmission lines 22 and 24. The −3.58 MHz intermodulation products are reflected back to load 214 as discussed previously. The aural component of the multiplexed signal which would also reflect and be dissipated in load 214 is allowed to pass by the aural cavities by returning or detuning arrangements 332 and 334 coupled to aural cavities 38 and 40, respectively, and ganged for operation with switch 326 as illustrated by dotted line 336.

Figure 4:
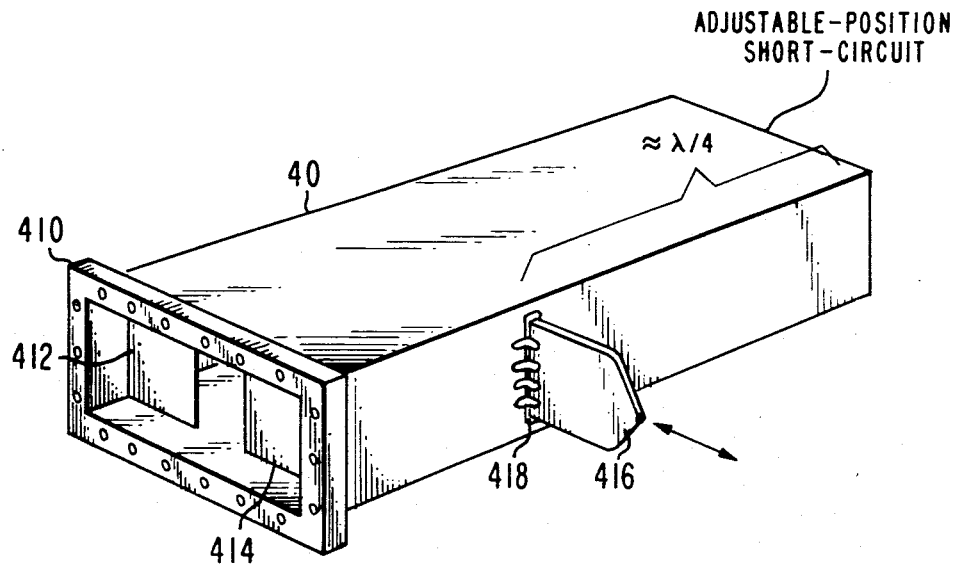
FIG. 4 is a perspective view of an aural filter adapted for use in conjunction with the arrangement of FIG. 3.

Detuning apparatus 332 is similar to apparatus 334, so only detuning apparatus 334 is illustrated in FIG. 4. In FIG. 4, aural cavity 40 is illustrated in perspective view. Generally, aural cavity 40 includes a rectangular waveguide section having a flange 410 for mechanical coupling to transmission line 24. Visible within the waveguide is an entrance iris formed by a pair of plates 412, 414 which aids in control of the coupling to the cavity. At the end of the cavity remote from flange 410 is a short-circuit (not visible in the view of FIG. 4) which is somewhat adjustable for tuning purposes. Detuning of the cavity is accomplished by means of a detuning plate 416 arranged to slide into and out of the narrow or E-wall of the waveguide through a slot 418. Spring contact fingers coupled to the wall of the waveguide bear against both sides of plate 416 throughout its range of motion, providing good electrical contact to plate 416 and also providing electrical continuity across slot 418.

Slot 418 is formed in the cavity at a point approximately one-quarter wavelength ($\lambda/4$) from the short-circuited end, thereby placing the plate at a current null to reduce the flow of current in the spring fingers and the resulting heating effect. For many frequencies, slot 418 and plate 416 will be closer to flange 410 than is illustrated. Also, it may not be possible for all cavities to have plate 416 at the exact quarter-wave point, but this is not critical to the invention.

The penetration of plate 416 into the waveguide introduces a parallel inductive equivalent reactance which parallels the equivalent resonant inductance and thereby raises the tuned frequency, or detunes it from the aural carrier frequency. It is desirable to raise the frequency rather than detuning on the low side, because detuning to the low side might cause undesired coupling to the lower sideband cavities and perturb their operation. The degree of penetration will be determined by the system requirements, but in a particular embodiment a penetration of about one-third of the guide width has been found to provide sufficient detuning.

Figure 5:
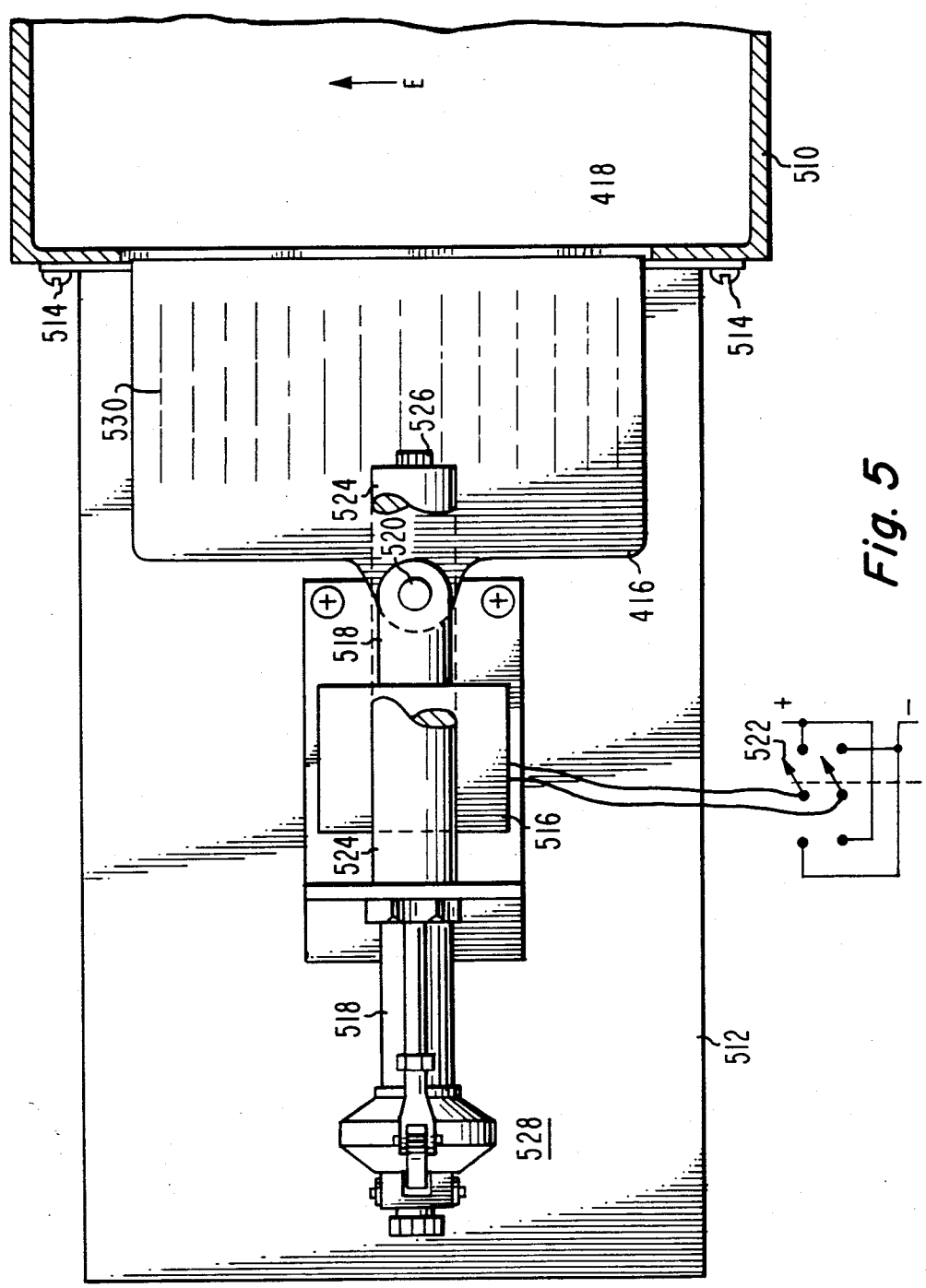
FIG. 5 is a simplified mechanical layout for a drive for the plate illustrated in FIG. 4.

While mechanical motion of switch 326 could be ganged with motion of plate 416, it is generally desirable to operate the plate from a remote location. FIG. 5 illustrates in simplified form the mechanical layout for support and drive of plate 416. In FIG. 5, the wall 510 of the waveguide has been cut away through slot 418. A support frame 512 is fastened to the narrow wall of the waveguide by screws 514. A linear motor 516 operates on a through shaft 518 coupled by a pin 520 to plate 416. Motor 516 is coupled by wires to a reversing switch 522 which may be ganged with switch 326 for remote operation. For fast operation, motor 516 may be relatively powerful. However, the acceleration of a powerful motor may result in excessive velocity near the end of travel. This is avoided by a dashpot 524 illustrated partially cut-away having an adjustable orifice 526 which limits the maximum velocity but allows full acceleration. In order to limit the length of the assembly, dashpot 524 is mounted above motor 516 and their shafts are linked by a toggle arrangement designated generally as 528, whereby the direction of shaft motion is reversed.

It will be noted that as illustrated, plate 416 bears marking 530 resulting from the pressure of the spring contact fingers fastened to the waveguide, which are not visible in this view. Other embodiments of the invention will be apparent to those skilled in the art. For example, the baseband video signals may be directly converted to the proper carrier frequencies by a controllable or modulatable oscillating power device, which would obviate the need for separate modulators and low-level carrier oscillators. Coaxial transmission lines and/or circular waveguides may be used in some or all portions of the system. The filtration for removal of unwanted modulation products may be much more extensive than that shown. Many mechanical arrangements for detuning are possible, including a solenoid-operated shorting plate for reducing the length of the aural cavity. The mechanical drive and control circuits may be more elaborate, using position sensors for verifying operation, limit switches for controlling the exact amount of travel, and digital remote control by means of digital transmitters and receivers for reducing the number of power carrying conductors routed through the transmitter site.

What is claimed is:

1. An improved arrangement for coupling to an antenna signals from a source of television signals modulated onto a carrier and an associated audio signal modulated onto a carrier at a frequency offset from said carrier frequency, the arrangement comprising:
   a source of television video signals;
   a visual power generator coupled to said source of television video signals for producing a television video signal modulated onto a first carrier at a power level suitable for coupling to a transmitting antenna;
   a source of audio signals modulated onto a second carrier, said second carrier having a nominal frequency offset from that of said first carrier,
   an aural power amplifier coupled to said source of audio signals modulated onto a second carrier for generating aural power signals at a level suitable for coupling to a transmitting antenna, said aural power amplifier being subject to failure;
   a load;
   a first four-port hybrid having a first port coupled to said visual power generator, a second port coupled to said load, and third and fourth ports coupled to first and second transmission lines, respectively, for splitting said visual power into first and second portions propagated in said first and second transmission lines, respectively;
   a second four-port hybrid having first and second ports coupled to said first and second transmission lines, respectively, for receiving said first and second portions of said visual power and for combining said first and second portions for propagation to a third port for coupling to an antenna, said second hybrid also having a fourth port coupled to said aural power amplifier for splitting said aural power signals into first and second portions coupled to said first and second transmission lines, respectively, for causing said aural power signals to be propagated towards said first hybrid, whereby said aural power signals will not reach said antenna and may perturb said visual power generator;
   first and second tuned mismatch generating means coupled to said first and second transmission lines for presenting a mismatch to said first and second transmission lines at the frequency of said second carrier for reflecting back towards said second hybrid said first and second portions of said aural power signals whereby said first and second portions of said aural power signals are combined in said second hybrid and coupled to said third port of said second hybrid whereby said aural power signals are coupled to said antenna together with said visual power, and said visual power generator is isolated from said aural power amplifier and is therefore not perturbed, but failure of said aural power amplifier may result in transmission of said visual power without an accompanying audio signal, wherein the improvement lies in emergency coupling means for coupling said source of audio signals modulated onto said second carrier to said visual power generator for generation by said visual power generator of a combined power visual and aural signal, whereby said tuned mismatch generating means coupled to said first and second transmission lines reflect back towards said first hybrid that portion of said power visual and aural signal near the frequency of said second carrier, resulting in perturbation of the operation of said visual power generator and transmission to said antenna of a visual signal with an attenuated aural signal; and detuning means coupled to said emergency coupling means and to said tuned mismatch generating means for detuning said tuned mismatch generating means whereby said mismatch moves out of a television channel, said portion of said combined power visual and aural signal is not reflected and said combined power visual and aural signal is coupled to said antenna.

2. An arrangement according to claim 1 wherein each of said tuned mismatch generating means comprises a short-circuited third transmission line.

3. An arrangement according to claim 2 wherein said detuning means comprises shunt inductance means for increasing the tuned frequency.

4. An arrangement according to claim 3 wherein said shunt inductance means comprises a mechanically movable iris plate.

5. An arrangement according to claim 4 wherein said third transmission line is a rectangular waveguide.

6. An arrangement according to claim 5 wherein said iris plate is a plate inserted through a narrow wall of said rectangular waveguide.

7. An arrangement according to claim 6 wherein said iris plate is inserted approximately one-half-wavelength from said short-circuit.

8. An arrangement according to claim 7 wherein said short-circuited rectangular waveguide is coupled to one of said first and second transmission lines by means of a fixed iris.

9. An arrangement according to claim 8 further comprising stubs parallel with said narrow wall inserted into one of said first and second transmission lines.

10. An arrangement according to claim 1 wherein said visual signal is a color signal including a color subcarrier at a second offset frequency from said frequency of said first carrier, and further reflective tuned mismatch means is coupled to each of said first and second transmission lines, said further tuned mismatch means being tuned to a frequency below the frequency of said first carrier by the same offset as said color subcarrier is above said first carrier.

* * * * *